(No Model.)
L. P. ROGERS & J. HOFMAN.
TRANSPORTING RECEPTACLE.
No. 440,885. Patented Nov. 18, 1890.
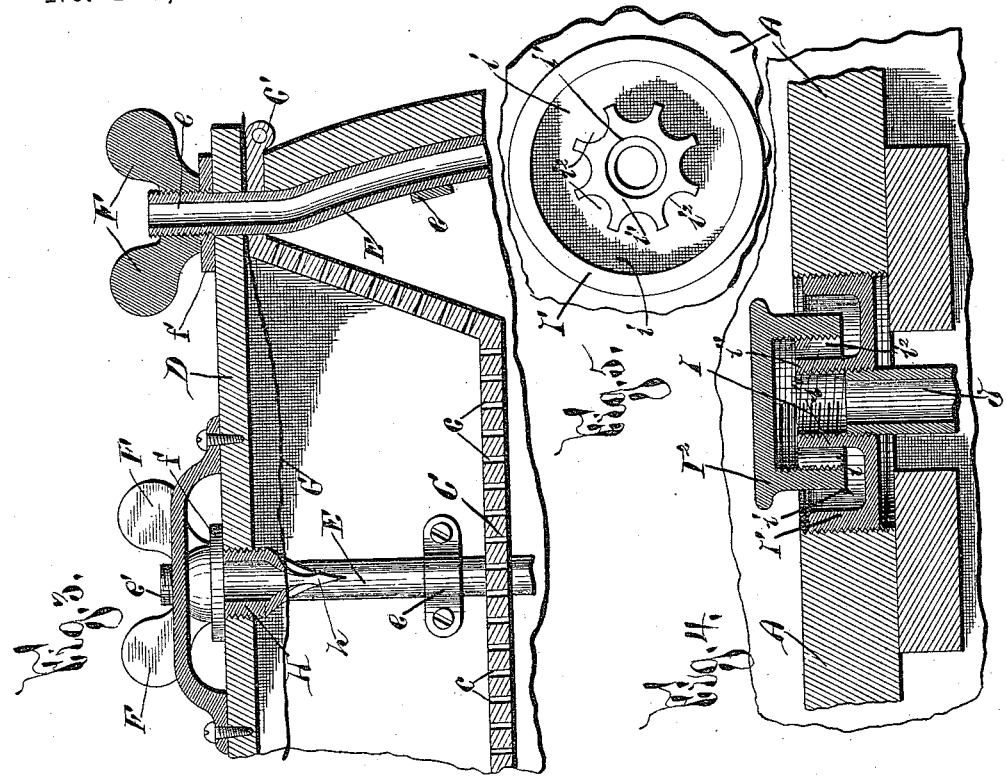
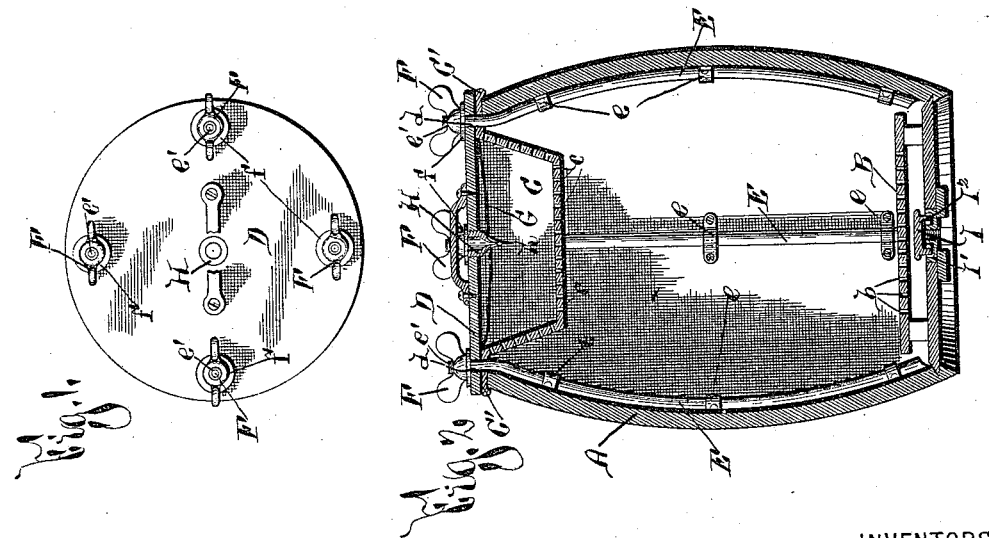
WITNESSES:
INVENTORS
Louis P. Rogers
John Hofman
BY George W. Hey
ATTORNEY

UNITED STATES PATENT OFFICE.

LOUIS P. ROGERS AND JOHN HOFMAN, OF ROCHESTER, NEW YORK.

TRANSPORTING-RECEPTACLE.

SPECIFICATION forming part of Letters Patent No. 440,885, dated November 18, 1890.

Application filed September 11, 1889. Serial No. 323,647. (No model.)

*To all whom it may concern:*

Be it known that we, LOUIS P. ROGERS and JOHN HOFMAN, of Rochester, in the county of Monroe, in the State of New York, have invented new and useful Improvements in a Transporting-Receptacle, of which the following, taken in connection with the accompanying drawings, is a full, clear, and exact description.

Our invention relates to an improved receptacle for transporting perishable articles, and has for its object the production of a simple and effective device, into which the said articles can be readily packed or loaded and by which they are preserved in a fresh condition; and to this end our invention consists, essentially, in a suitably-shaped inclosing-frame having an ice-tray at one end thereof, an inlet for admitting air over said ice, and an outlet for withdrawing the air from said receptacle, whereby a circulation is produced over or around said perishable articles.

It also consists in a device for carrying off the drip-water of the ice, and it furthermore consists in the detail construction and arrangement of the parts, all as hereinafter more particularly described, and pointed out in the claims.

In describing our invention reference is had to the accompanying drawings, forming a part of this specification, in which like letters indicate corresponding parts in all the views.

Figure 1 represents a plan view of one form of our improved invention. Fig. 2 represents a horizontal vertical section taken on line $xx$, Fig. 1. Fig. 3 represents an enlarged sectional detail view of the upper part of the devices illustrated in Fig. 2. Fig. 4 represents a sectional detail view of the trap for withdrawing the drip-water. Fig. 5 is a plan view of a detail of the water-trap.

A represents a suitable inclosing-frame for transporting the perishable articles, which may be of any desired kind. This frame is preferably made in the form of a barrel, as illustrated.

Secured at the bottom of the barrel A is the false bottom B, upon which is placed any desired kind of perishable article, as meat, fish, fruit, &c., which will not be injured by contact with the dripping ice-water.

Supported in any desirable manner at the top of the barrel A is a receptacle or tank C, which is partially or entirely filled with ice. The preferable manner of supporting said tank C is to provide the barrel A with a removable cover D and to form upon the receptacle C a projecting flange C', interposed between the top edge of the barrel and the underneath adjacent face of the cover D, and which is clamped in said position in a manner immediately described.

Extending from the base of the barrel, and preferably from a point below the false bottom B thereof, are the pipes or tubes E, secured to the inner periphery of said barrel by clips or other ties $e$, arranged at desirable intervals thereon, and preferably formed with their inner ends projecting above the top of the barrel. The cover D is provided with suitably-arranged perforations $d$, which register with the upper extremities of said tubes E, allowing the same to project upwardly therefrom, and thus form supports or guides for said cover. Bearing upon the top of the cover D, and screwing upon the projecting extremities of the tubes E, are the thumb-nuts F, between which and the top of the face we prefer to provide a washer $f$. By screwing down these thumb-nuts F the cover D is tightly impinged against the flange C', thereby clamping or retaining the tray C in its desired position.

In order to effect a tight joint between the barrel and its cover, we prefer to use a packing G, of any suitable material, which it is desirable to extend entirely across the top of the said tray C, in order to prevent the entrance of dust and other foreign substance to the interior of the barrel or other receptacle.

To allow the entrance of air within the receptacle A, in order that a circulation may be produced therein, we provide the inlet H, which, although it may be of any desirable form and construction, is here illustrated as a hollow nipple formed with the inwardly-projecting point $h$, which pierces the packing G and is provided with openings allowing the entrance of air on the inner face thereof. The air, passing through perforations provided in said ice-receptacle C, is drawn around and over the inclosed perishable articles and to the bottom of the receptacle A, whence it ascends upward through the tubes E and is discharged from the barrel at the upper extremity $e'$ of said pipes, upon which are screwed the nuts F. It will be understood that the ice will gradually become melted, and that there will be a constant drip therefrom through openings $c$, which we prefer to provide in the base of said receptacle. This drip-water accumulates in the base of the receptacle A, and is prevented from spoiling or unduly soaking the inclosed perishable articles by means of the false bottom B, which is also preferably provided with openings $b$ to allow the passage of the water to the underneath side thereof. To provide for the withdrawal of said water, we provide the trap I, as best shown in Figs. 4 and 5, which preferably consists of a disk or plate I', secured at the base of the receptacle A, and a cap $I^2$ above said disk or plate. The disk or plate I' is formed at the top face thereof with an annular recess $i$, producing the upwardly-projecting inner flange $i'$, which is preferably notched or scalloped inwardly, as at $i^2$. The cap $I^2$ screws around the outside of the flange $i'$, and, as clearly seen in Fig. 4, the notches or scallops $i^2$ form a connection or tube between the recess $i$ and the interior of the flange $i'$. The water constantly dripping from the ice fills up the recess $i$, rises within the notches or scallops $i^2$, and flows over the top of the flange $i'$ to the inside thereof. This water may, if desired, be withdrawn by means of a suitable pipe J, screwing on the interior of said flange $i'$, or it may be allowed to constantly drip from the trap I. It will be understood that the water thus prevents the entrance of air from the bottom of said receptacle, and that a continuous circulation is produced from the top to the bottom thereof.

The operation of our improved invention will be readily perceived from the foregoing, and it will be understood that a very desirable article or transporting receptacle is produced, which, with but slight additional cost of manufacture, can be used to transport perishable articles without any liability of their destruction or deterioration during their passage and will insure their arrival in as fresh condition as when first packed. We do not, however, limit ourselves to the precise form and construction of our invention, since it will be understood that considerable change may be made in the detail construction and arrangement of the parts without departing from the spirit of our invention.

Having thus fully described our invention, what we claim as new, and desire to secure by Letters Patent, is—

1. In a receptacle for preserving perishable articles during transportation and shipment, the combination of an outer shell, an ice-support mounted at the upper extremity of said shell, with a space below the same for the reception of the articles to be transported, an air-inlet passage having its outer end at the upper extremity of said outer shell and its inner end above said ice-support for admitting air from the outside of said receptacle directly to said ice-support, and an air-outlet passage, substantially as set forth, having its outer end extending through the wall at the upper end of said outer body, and having its inner end below said ice-support at the other extremity of said outer body for conducting air therefrom and producing a circulating current within the same from said ice-support, substantially as set forth.

2. In a receptacle for preserving perishable articles during transportation and shipment, the combination of a body or outer shell having an engaging shoulder, an ice-support having a shoulder for engaging said shoulder on the body, and a shield or apron above said ice-support for preventing the entrance of dust, &c., to said perishable articles, a clamp for securing said ice-support to said shoulder, an air-inlet passage for admitting air to said ice-support, and an air-outlet passage for conducting air from said receptacle and arranged with its inlet opposite to said ice-support, whereby a circulating current is produced within said receptacle, substantially as specified.

3. In a receptacle for preserving perishable articles during transportation and shipment, the combination of a body or outer shell, air tubes or passages for conducting the air from within said body and formed with their ends projecting beyond said body, a cover for said body, and clamps mounted on said projecting ends for securing the cover to said body, substantially as specified.

4. The combination, with an inclosing-frame and a removable cover or cap secured thereto, of an ice-receptacle in said inclosing-frame, an air-inlet passage at one extremity of said inclosing-frame, an air-outlet pipe leading from the opposite extremity of said inclosing-frame and extending through said removable cover, and a clamp mounted on said projecting extremity of said outlet-pipe for securing the said cover in position, substantially as set forth.

5. In a receptacle for preserving perishable articles, the combination of an inclosing-frame or outer shell during transportation and shipment, air-tubes projecting above said frame for conducting air from within said receptacle, a shield or apron above said ice-support for preventing the entrance of dust, &c., an ice-support within said receptacle, a cover for closing said receptacle and retaining said ice-support in position, and thumb-screws movably mounted upon said tubes for securing said cover in position, and an inlet for passing a current of air over said ice-support, substantially as described.

In testimony whereof we have hereunto signed our names, in the presence of two attesting witnesses, at Rochester, in the county of Monroe, in the State of New York, this 23d day of August, 1889.

LOUIS P. ROGERS.
JOHN HOFMAN.

Witnesses:
F. B. HUTCHINSON,
E. N. ADAMS.